United States Patent
Bai et al.

(10) Patent No.: US 11,710,170 B2
(45) Date of Patent: Jul. 25, 2023

(54) METHOD OF PROVIDING SALE-RELATED INFORMATION AND ELECTRONIC DEVICE USING THE SAME

(71) Applicant: Coupang Corp., Seoul (KR)

(72) Inventors: Qingqing Bai, Seoul (KR); Xiao Feng, Seoul (KR); Seon Il Kim, Seoul (KR); Hyun Gyu Jang, Seoul (KR); Su Jin Kyung, Seoul (KR); Jeong Min Yun, Seoul (KR); Weili Liu, Seoul (KR); Prakash Kadel, Seoul (KR); Ku Kang, Seoul (KR); Mengyuan Peng, Seoul (KR); Ki Woong Jang, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 17/171,798

(22) Filed: Feb. 9, 2021

(65) Prior Publication Data
US 2022/0207588 A1    Jun. 30, 2022

(30) Foreign Application Priority Data

Dec. 29, 2020 (KR) .......................... 10-2020-0185868

(51) Int. Cl.
G06Q 30/00 (2023.01)
G06Q 30/0601 (2023.01)
G06Q 20/40 (2012.01)

(52) U.S. Cl.
CPC ..... *G06Q 30/0631* (2013.01); *G06Q 20/4014* (2013.01); *G06Q 30/0633* (2013.01)

(58) Field of Classification Search
None
See application file for complete search history.

(56) References Cited

U.S. PATENT DOCUMENTS 9,703,938 B2 * 7/2017 Asghari-Kamrani ....................... G07F 7/1008
9,965,794 B1 * 5/2018 Brazil ................ G06Q 30/0633
(Continued)

FOREIGN PATENT DOCUMENTS

JP    2001-312658 A    11/2001
JP    2002-297954 A    10/2002
(Continued)

OTHER PUBLICATIONS

Zheng Qin, "Introduction to E-commerce", 2009, Springer, springer.com (Year: 2009).*

(Continued)

*Primary Examiner* — Michelle T Kringen
*Assistant Examiner* — Norman Donald Sutch, Jr.
(74) *Attorney, Agent, or Firm* — Knobbe, Martens, Olson & Bear LLP

(57) ABSTRACT

According to various example embodiments, a method of providing order-related information by an electronic device may include obtaining order information on or regarding a purchase item and customer information corresponding to the order information, transmitting the order information and the customer information to an external device, receiving, from the external device, sale-related information on or regarding a sales item that corresponds to the purchase item and is for sale by the customer, and providing at least some of the order information and the sale-related information on a first page.

16 Claims, 16 Drawing Sheets

(56) References Cited

U.S. PATENT DOCUMENTS

| | | | |
|---|---|---|---|
| 10,055,732 B1* | 8/2018 | Hecht | G06Q 20/401 |
| 10,783,570 B1* | 9/2020 | Mikkola | G06Q 30/0633 |
| 10,931,671 B1* | 2/2021 | Pearce | G06Q 20/3226 |
| 2003/0120369 A1 | 6/2003 | Takaoka et al. | |
| 2004/0117319 A1* | 6/2004 | Oshima | G06Q 20/401 |
| | | | 705/75 |
| 2006/0235796 A1* | 10/2006 | Johnson | G06Q 20/4014 |
| | | | 705/26.1 |
| 2008/0178270 A1* | 7/2008 | Buss | H04L 63/166 |
| | | | 726/5 |
| 2013/0159136 A1 | 6/2013 | Park et al. | |
| 2015/0206200 A1* | 7/2015 | Edmondson | G06Q 10/30 |
| | | | 705/306 |
| 2015/0242870 A1* | 8/2015 | Rothman | G06Q 30/0208 |
| | | | 705/14.11 |
| 2016/0132840 A1* | 5/2016 | Bowles | G06Q 10/30 |
| | | | 705/306 |
| 2016/0314473 A1* | 10/2016 | Engles | G06Q 30/016 |
| 2017/0039546 A1 | 2/2017 | Zhang et al. | |
| 2017/0098262 A1* | 4/2017 | Brockman | G06Q 40/02 |
| 2017/0109799 A1* | 4/2017 | Swinson | G06Q 30/0278 |
| 2020/0175569 A1 | 6/2020 | Kobayashi | |

FOREIGN PATENT DOCUMENTS

| | | | | |
|---|---|---|---|---|
| JP | 2004334519 A | * | 11/2004 | G06Q 30/06 |
| JP | 2005-063023 A | | 3/2005 | |
| JP | 2006-209255 A | | 8/2006 | |
| JP | 2010-244234 A | | 10/2010 | |
| JP | 2019-008685 A | | 1/2019 | |
| KR | 10-2001-0035454 A | | 5/2001 | |
| KR | 10-2018-0038450 A | | 4/2008 | |
| KR | 10-2009-0100660 A | | 9/2009 | |
| KR | 10-2011-0011292 A | | 2/2011 | |
| KR | 10-2013-0033753 A | | 4/2013 | |
| KR | 10-1302352 B1 | | 9/2013 | |
| KR | 10-1338269 B1 | | 12/2013 | |
| KR | 10-2014-0086783 A | | 7/2014 | |
| WO | WO 2018-230693 A1 | | 12/2018 | |

OTHER PUBLICATIONS

Adeyemi Adepetun; "Slot Partners Matrix to Launch Trade-in Programme"; May 20, 2015; AllAfrica Global Media (Year: 2015).*

* cited by examiner

FIG. 4C

Estimated trade-in price for used device ✕

| Price by grade | ✕ |
|---|---|
| Grade S | |
| Liquid crystal | Normal |
| Back(side) panel | Normal |
| Afterimage | Normal |
| Fingerprint/face ID | Normal |
| Compass | Normal |
| LCD | Normal |
| Voice recording | Normal |
| Camera | Normal |
| Wi-Fi | Normal |
| Power supply | Normal |

Continue shopping

Company A × Company B
Application completed

✓ — ✓ — ✓ — ④
Select device | Check market price | Fill out application | Application completed

8/13 (FRI) scheduled collection

Applicant and collection Information

| | |
|---|---|
| Applicant | Kim○○/010-1234-5678 |
| Collection address | Seoul |
| Collection request | Front door |
| Account information | ○○BANK/0000-000000-0000 |

Used device information

| | |
|---|---|
| Application device | Phone 256GB |
| Estimated trade-in price | Max. 620,000 won |

Procedure after application

1. Device reset and unlock
2. Used device packaging before collection
3. Check final trade-in price determined after inspection
4. Receive trade-in price after sale confirmation is completed

[View application details] [Back to Company A]

METHOD OF PROVIDING SALE-RELATED INFORMATION AND ELECTRONIC DEVICE USING THE SAME

BACKGROUND

Technical Field

Various example embodiments of the present disclosure relate to a method of providing sale-related information on or regarding items and an electronic device using the same.

Description of the Related Art

For various products including home appliances, the proportion of those used for a certain period and sold as used goods is increasing. As transactions between individuals are active, the number of companies that intermediates sale of mobile phones is increasing. For example, an application related to a mobile device trade-in method in Patent Publication No. 10-2014-0086783 of Park Gwang-cheol et al. may be referred to.

Trade-in may mean setting a price for a new or used item according to a certain criterion, and selling the item at a set price. If a customer purchases an item and places an order for future trade-in for the purchased item, the company that sells the item can manage information related to the trade-in together.

SUMMARY

Technical Goals

From the point of view of a customer who purchases an item, disposing of the purchased item after using it for a certain period may be inconvenient in terms of having to find a buyer and not receiving a desired price.

From the point of view of a trade-in company, there may be risks in direct transactions with individuals because they may purchase used items to be disposed of after a certain period of use at high prices and because the reliability of trade-in items is low due to the risk of lost or stolen items.

In order to solve the above-described problems, the present disclosure aims to provide a method of providing sale-related information and an electronic device using the same to manage information in an integrated manner while intermediating between customers who want to purchase and sell items and companies that perform trade-in.

Technical Solutions

A method of providing order-related information by an electronic device according to various example embodiments includes obtaining order information on or regarding a purchase item and customer information corresponding to the order information, transmitting the order information and the customer information to an external device, receiving, from the external device, sale-related information on a sales item that corresponds to the purchase item and is for sale by the customer, and providing at least a portion of the order information and the sale-related information on a first page.

An electronic device according to various example embodiments includes a transceiver, a database, and a processor, wherein the processor is configured to obtain order information on a purchase item and customer information corresponding to the order information, transmit the order information and the customer information to an external device, receive, from the external device, sale-related information on a sales item that corresponds to the purchase item and is for sale by the customer, and provide at least a portion of the order information and the sale-related information on a first page.

Effects

According to various example embodiments, a method of providing sale-related information may reduce inconvenience of customers and trade-in companies by intermediating an application for trade-in of a purchase item through an external company at the same time as the purchase of the item.

According to various example embodiments, an electronic device may intermediate a reliable transaction by providing an item purchase and trade-in application of a purchaser or a trade-in application after an item purchase of a purchaser through one order or an additional order after the one order. In addition, the electronic device can effectively provide purchase and sale information to purchasers and external companies by managing order information, purchaser information, and external company information related to trade-in in an integrated manner.

BRIEF DESCRIPTION OF THE DRAWINGS

FIGS. 4A to 4C are exemplary diagrams illustrating data related to sale price in an information providing method according to various example embodiments.

FIGS. 6A to 6E are diagrams illustrating examples of inputting information input corresponding to link information of an information providing method according to various example embodiments.

DETAILED DESCRIPTION

Figure 1:
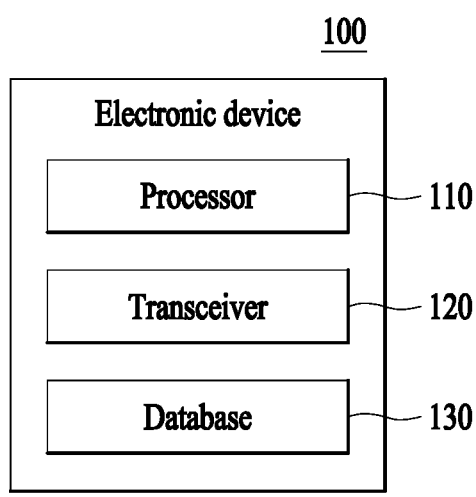
FIG. 1 is a block diagram illustrating internal components of an electronic device according to various example embodiments.

The terms used in the example embodiments have been selected as general terms that are currently widely used as possible while taking functions in the present disclosure into consideration, but these may vary according to the intention of those skilled in the art, a precedent, the emergence of new technologies, and the like. In addition, in certain cases, there are terms arbitrarily selected by the applicant, and in this case, the meaning will be described in detail in the corresponding description. Therefore, the terms used in the present disclosure should be defined based on the meaning of the term and the whole contents of the present disclosure, not just the name of the term.

Throughout the specification, when it is stated that a part "includes" a certain component, it means that other components may be further included, and it does not preclude other components, unless otherwise stated. In addition, terms such as " . . . unit", " . . . module" described in the specification mean a unit for performing at least one function or operation, which may be implemented as hardware or software, or as a combination of hardware and software.

Throughout the specification, expression "at least one of a, b, and c" may include "a only", "b only", "c only", "a and b", "a and c", "b and c", or "all of a, b, and c."

The "terminal" described below may be implemented as a computer or a portable terminal that may access a server or other terminals through a network. Here, computers may include, for example, a notebook, a desktop, a laptop, and the like, which are equipped with a web browser, and portable terminals are wireless communication devices that ensure portability and mobility, and may include, for example, International Mobile Telecommunications (IMT), code division multiple access (CDMA), W-code division multiple access (W-CDMA), and Long Term Evolution (LTE) terminals, and all kinds of handheld-based wireless communication devices, such as a smartphone and a tablet PC.

In the following description, example embodiments of the present disclosure will be described in detail with reference to the drawings so that those skilled in the art can easily carry out the present disclosure. The present disclosure may be embodied in many different forms and is not limited to the example embodiments described herein.

Hereinafter, example embodiments of the present disclosure will be described with reference to the drawings.

In describing the example embodiments, descriptions of technical contents well-known in the technical field to which the present disclosure pertains and are not directly related to the present disclosure will be omitted. This aims to omit unnecessary description so as to avoid obscuring and more clearly convey the gist of the present disclosure.

For the same reason, some elements are exaggerated, omitted, or simplified in the drawings. In addition, the size of each element does not fully reflect the actual size. The same reference numerals are assigned to the same or corresponding elements in each drawing.

Advantages and features of the present disclosure and methods of accomplishing the same may be understood more readily by reference to the following detailed description of example embodiments and the accompanying drawings. The present disclosure may, however, be embodied in many different forms and should not be construed as being limited to the example embodiments set forth herein. Rather, these example embodiments are provided so that this disclosure will be thorough and complete and will fully convey the concept of the disclosure to those skilled in the art, and the present disclosure will only be defined by the appended claims. Like reference numerals refer to like elements throughout the specification.

It will be understood that each block of the flowcharts, and combinations of blocks in the flowcharts, can be implemented by computer program instructions. These computer program instructions may be provided to a processor of a general-purpose computer, special purpose computer, or other programmable data processing apparatus, such that the instructions which are executed via the processor of the computer or other programmable data processing apparatus create means for implementing the functions described in the block(s) of flowcharts. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means which implement the function described in the block(s) of flowcharts. The computer program instructions may also be loaded onto a computer or other programmable data processing apparatus to cause a series of operational steps to be performed on the computer or other programmable apparatus to produce a computer implemented process such that the instructions which are executed on the computer or other programmable apparatus provide steps for implementing the functions described in the block(s) of flowcharts.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or may be performed in reverse order according to their functions.

FIG. 1 is a block diagram illustrating internal components of an electronic device according to various example embodiments.

Referring FIG. 1, internal components of an electronic device 100 are not limited to the illustrated components. The electronic device 100 may include at least one of a processor 110, a transceiver 120, and a database 130.

The processor 110 may process a series of operations for performing an information providing method according to various example embodiments of the present disclosure. The processor 120 may control other components of the electronic device 100.

The processor 120 may obtain order information on or regarding a purchase item of a customer and customer information corresponding to the order information. For example, the processor 120 may provide an order page to obtain the order information in response to an order completion of the purchase item that the customer intends to order. The customer information may include the customer's name, the customer's contact information, a delivery address, and so on.

The processor 120 may transmit the order information and the customer information to an external device. For example, the external device may include a server that sells the item ordered on behalf of the customer. Selling an item on behalf of the customer by the external device may include a trade-in on the item purchased. In this specification, a process of selling the item purchased by the customer through the external device is interchangeably described as a trade-in process.

The processor 120 may receive sale-related information on the sales item that corresponds to the purchase item and the customer intends to sell from the external device. For example, the customer may want to sell the purchased item after using it for a certain period. The electronic device 100 may perform an information providing method intermediating sale between the customer and the external device.

The processor 120 may provide the customer with at least some of the order information and the sale-related information on a specific page. For example, the processor 120 may provide the order information ordered by the customer and information related to future sale of the ordered item on a web page of order details indicating order completion. The sale-related information may include information related to sale of the item ordered by the customer.

The transceiver 120 may perform a function of transmitting information stored in the database 130 of the electronic device 100 or information processed by the processor 110 to another device, or receiving information from another device to the electronic device 100. For example, the electronic device 100 may receive data related to a sale price of an item that a customer wants to sell from an external device through the transceiver 120. For another example, the electronic device 100 may transmit order information, customer information, or authentication information for sale of an item purchased by a customer, to an external device through the transceiver 120.

The database 130 is a data structure implemented in a predetermined storage space of the electronic device 100, and functions such as storing, searching, deleting, editing, or adding data may be freely performed. For example, the database 130 may include fields or elements for processing functions such as storing, searching, deleting, editing, or adding data. The database 130 may store data related to the electronic device 100 performing a method of managing data. For example, the database 130 may store instructions or data for an execution operation of the processor 110.

Figure 2:
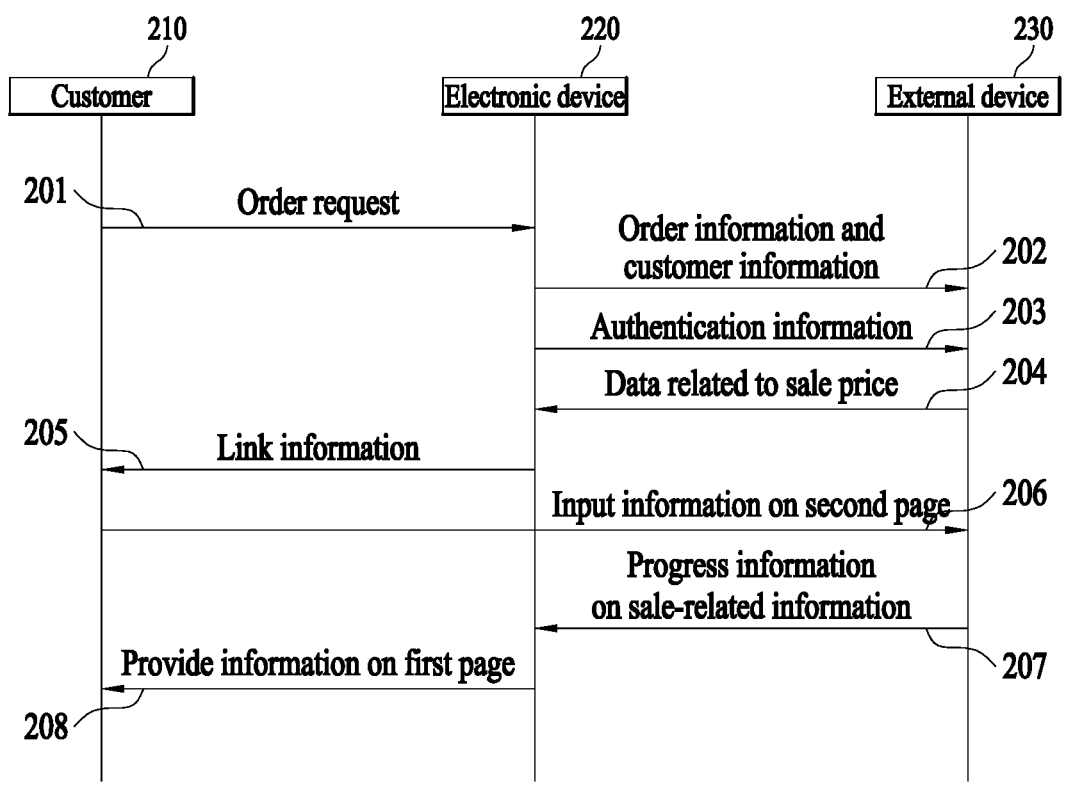
FIG. 2 is a flowchart illustrating an information providing method of an electronic device in a network environment according to various example embodiments.

FIG. 2 is a flowchart illustrating an information providing method of an electronic device in a network environment according to various example embodiments.

Referring to FIG. 2, an electronic device 220 (e.g., the electronic device 100 of FIG. 1) may provide a purchase item in response to an order request from a customer 210, and may provide information associated with an external device 230 if a sale order for the purchase item is requested together. Purchase information of the item and sale information of the purchase item may be included together in the customer's order request information, and the present specification is described on the premise that both the purchase of the item and sale information of the purchase item at a later time are applied at the same time as the order request.

The electronic device 220, the customer 210, and the external device 230 may transmit or receive data between them. What is illustrated as the customer 210 in FIG. 2 may include a terminal (e.g., a smartphone or a computer) possessed by the customer 210.

In operation 201, the electronic device 220 may receive an input of an order request for an item that the customer 210 intends to purchase. For example, the electronic device 220 may provide the customer 210 with an order request page and receive an input of an order request of the customer 210 including a mobile phone (e.g., a mobile terminal) as a purchase item on the order page. The electronic device 220 may obtain order information on or regarding a purchase item when the order request of the customer 210 changes to order completion. For example, the electronic device 220 obtains data on order information of the customer 210 that is accumulated and stored in a database (e.g., the database 130 of FIG. 1), or obtains data on order information of the customer 210 from a storage in a distributed network environment, and a method of obtaining data on order information is not limited. The electronic device 220 may obtain customer information corresponding to the order information of the customer 210 together with the order information.

The electronic device 220 may transmit the order information and the customer information obtained in operation 202 to the external device 230. For example, the electronic device 220 may transmit, to the external device 230, the order information obtained through the order request in operation 201 and the customer information corresponding to the order information. Information transmitted by the electronic device 220 may be implemented in a form capable of being transmitted or received as data. In an example embodiment, when requesting an order, trade-in information may be input, and the trade-in information may be managed as an intangible product related to a tangible product ordered by a customer. However, for intangible products, if the purchase of the tangible product purchased by the customer is canceled, the purchase of the intangible product corresponding to the trade-in may also be canceled. In an example embodiment, an application for a trade-in may be possible even after an order for a tangible product is completed, but if there is no order for a tangible product, a separate application may not be possible. In addition, in an example embodiment, when there are a plurality of purchase items included in the order information, application for a trade-in of the customer may be made only once. For example, if the purchase items of the customer are a 'first cell phone' and a 'second cell phone (e.g., an item that can be applied for trade-in with an item that are the same as or different from the 'first mobile phone')", the customer may apply for trade-in for only the 'first mobile phone', or for only the 'second mobile phone', or for both the 'first mobile phone' and 'second mobile phone', with or after order. If a customer has applied for a trade-in for only the "first mobile phone", it may not be possible to apply for a trade-in for the "second mobile phone" in the future.

The electronic device 220 may transmit authentication information to the external device 230 in operation 203. For example, the electronic device 220 may provide the customer 210 with link information for accessing the external device 230. Before transmitting the link information to the customer 210, the electronic device 220 may transmit the authentication information corresponding to the link information to the external device 230. The authentication information may be transmitted between the electronic device 220 and the external device 230, and may include information for which the external device 230 performing a trade-in on the purchase item of the customer 210 determines if it corresponds to a sale request for the purchase item. The authentication information may include information having validity for a preset time. For example, when the electronic device 220 transmits the authentication information to the external device 230, the external device 230 may determine whether the authentication information is transmitted from the electronic device 220 within a preset time. The authentication information that has passed a preset time period does not correspond to valid information transmitted from the electronic device 220 and is discarded, and operation 203 may be performed again. The authentication information may include information that is determined by receiving a token issued from specific the electronic device 220 for a preset time by the external device 230. Meanwhile, in an example embodiment, the electronic device 220 and the external device 230 may perform a procedure of exchanging the authentication information in order to provide the customer with the link information in this operation. By exchanging such authentication information and creating a link based on the authentication information to provide the customer with, the customer can access a page that can be linked with the external device 230 based on the link information obtained through the electronic device 220. In an example embodiment, information related to the authentication information may be included in the link information, and the customer may access the second page according to the link information.

The electronic device 220 may transmit the authentication information to the external device 230 when the order information includes application information for trade-in in operation 203. The authentication information may include information using a two-way token authentication technology. For example, the electronic device 220 may transmit a public token to the external device 230. The external device 230 receiving the public token may transmit the secret token to the electronic device 220 within a time period during which the public token of the electronic device 220 is valid. The electronic device 220 may receive the secret token and check whether it corresponds to an external company contracted for trade-in. For another example, the electronic device 220 may transmit information using a one-way token authentication technique in operation 203. The electronic device 220 transmits a public token valid for a certain time to the external device 230, and may receive, for proceeding to operation 204, at least one of data related to the sale price and a request message for transmission of link information for a trade-in application, from the external device 230 within a certain period of time. For example, when the electronic device 220 fails to receive at least one of data related to the sale price and a request message for transmission of link information for a trade-in application from the external device 230 within a certain period of time, performance of operations 204 to 207 can be omitted. For another example, if the electronic device 220 receives at least one of data related to the sale price and a request message for transmission of link information for a trade-in application from the external device 230 within a certain period of time, operations following operation 203 can be performed.

The operation of transmitting or receiving the authentication information between the electronic device 220 and the external device 230 is not limited to a method using a token authentication technology, and various methods may be used.

In operation 204, the electronic device 220 may receive, from the external device 230, data related to a sale price for a sales item that the customer intends to sell. For example, the electronic device 220 may receive, from the customer 210, an order request for later selling the purchase item while ordering an item intended to purchase. The electronic device 220 may provide the customer 210 with at least one of an order request page and an interface for purchasing and selling items. The external device 230 may include a server of an external company (e.g., a trade-in company) capable of performing sale (e.g., trade-in) on the items sold by the customer 210. The electronic device 220 may receive, from the external device 230, data related to a sale price corresponding to a condition of the item and an expected sale time of the item for sale by the customer 210. The data related to a sale price may be periodically received from the external device 230 to the electronic device 220. For example, operation 204 may be repeatedly performed at a period of an arbitrary time (e.g., 10 minutes). The electronic device 220 may receive data related to the sale price and provide the customer 210 with it, and update the data according to the same period as in operation 204 or a different period.

The electronic device 220 may transmit link information to the customer 210 in operation 205. For example, the link information may include information for the customer 210 to access the external device 230. The link information may include information for accessing an information input page (e.g., a second page) for selling items of the customer 210 through the external device 230. In the present specification, the link information for accessing the external device, the second page corresponding to the link information, or the second page accessible based on the authentication information may interchangeably described as the second page.

The electronic device 220 may receive an information input from the customer 210 regarding the link information provided in operation 205. Referring to FIG. 2, when input information of the customer 210 is obtained in the information input page provided in operation 206, the information in the page may be provided to the external device 230. The method of providing information by the electronic device 220 may not be limited to the example shown in FIG. 2, and the electronic device 220 may receive information of the customer 210 inputted on the second page in operation 206 and transmit it to the external device 230. The information input to the second page may include detailed information on or regarding an item for trade-in and information on a pickup time and location for trade-in. Meanwhile, information related to trade-in provided to the customer may be updated according to information input on the second page. The trade-in information entered on the second page may be more detailed than the information directly obtained by the electronic device 220, and the information related to trade-in may be updated after the operator of the external device 230 checks the condition of the item to be traded-in. In addition, the external device may provide the electronic device 220 with information on which payment has been made to the customer in response to the trade-in. In addition, in another example embodiment, information on the collection of an item corresponding to the trade-in and the price of the corresponding item are provided to the electronic device 220, and the electronic device 220 may provide the customer 210 with a compensation corresponding to the trade-in. The compensation corresponding to the trade-in may be performed through cash deposit or by transmitting points used for purchasing goods related to the electronic device 220 to the customer.

The electronic device 220 may receive progress information on sale-related information from the external device 230 in operation 207. For example, the sale-related information may include at least one of information on the sales item of the customer 210, sale guide information corresponding to the purchase item, and data related to the sale price of the purchase item. In addition, at least some of the information obtained by the external device 230 in operation 206 may be transmitted to the electronic device 220.

The electronic device 220 may provide the customer 210 with at least some of order information and sale-related information on the first page in operation 208. The electronic device 220 may provide the customer 210 with data related to the condition of the sales item and the sale price according to the expected sale time of the sales item on the first page. The first page may include at least one of an order completion page, an order list page, and an order content page, and may mean a page that provides information on a purchase item. In this specification, the names of pages that may be included in the first page may be interchangeably described as the first page.

Figure 3A:
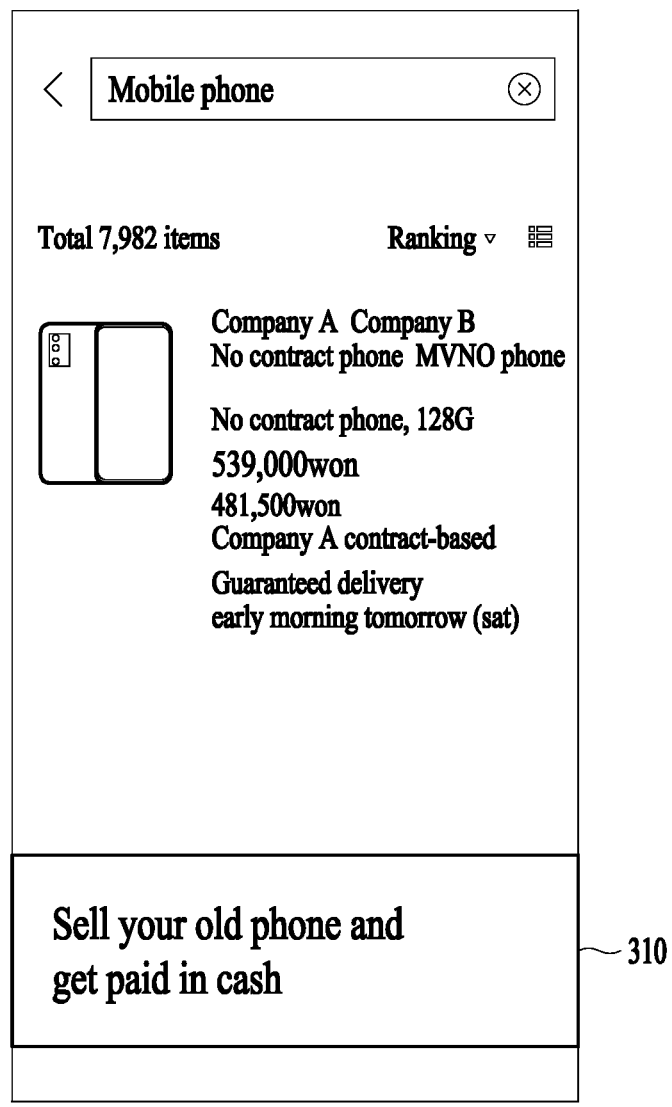
FIGS. 3A to 3C are diagrams illustrating examples of providing a sale guide in a search page or an order page of an information providing method, according to various example embodiments.
Figure 3B:
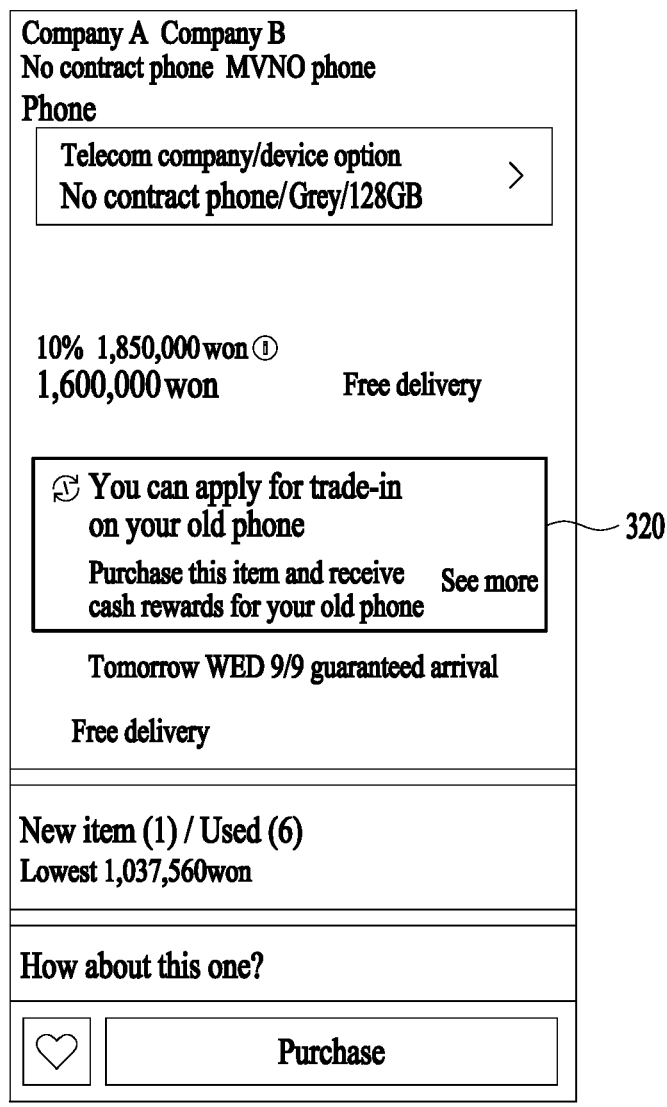
Figure 3C:
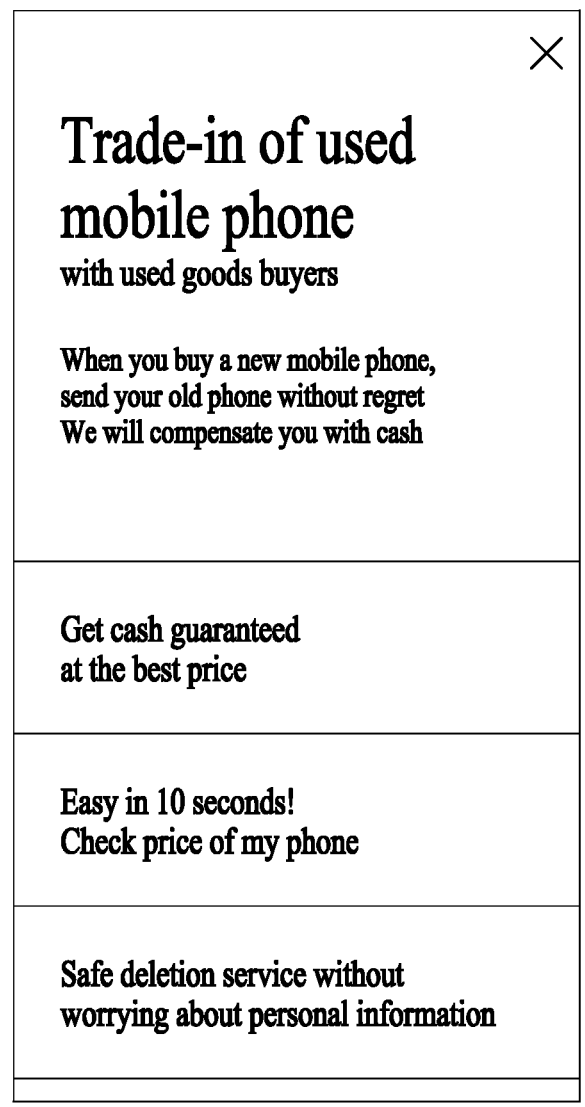

FIGS. 3A to 3C are diagrams illustrating examples of providing a sale guide in a search page or an order page of an information providing method according to various example embodiments.

FIG. 3A is an exemplary diagram of a page provided by an electronic device (e.g., the electronic device 100 of FIG. 1 or the electronic device 220 of FIG. 2) to a customer (e.g., the customer 210 of FIG. 2) for item search.

The electronic device may provide sale guide information 310 corresponding to the purchase item on an item search page. Referring to FIG. 3A, the electronic device compares at least some of information stored in a database (e.g., the database 130 of FIG. 1) with the customer's item search information, and, if the searched item is an item that can be traded in, sale guide information 310 corresponding to the purchase item may be provided on the item search page. For example, the electronic device obtains search information for mobile phone (e.g., search information for 'iPhone 12') of the customer, compares whether it matches information on or regarding items that can be traded in, and, if it is determined that the comparison information matches, sale guide information 310 for the sales item may be provided on the search page or the search result page. The sale guide information 310 for the sales item may still be provided on the search page or the search result page even if it is determined that the comparison information does not match.

FIG. 3B is an exemplary diagram of an order page provided by an electronic device to a customer for an item order.

An electronic device (e.g., the electronic device 100 of FIG. 1 or the electronic device 220 of FIG. 2) may provide sale guide information 320 corresponding to the purchase item (e.g., sale guide information 310 corresponding to the purchase item of FIG. 3A) on an order page. For example, the electronic device compares at least some of information stored in a database (e.g., the database 130 of FIG. 1) with the customer's order information, and, if the item being ordered is an item that can be traded in, sale guide information 320 corresponding to the purchase item may be provided on the item order page. The electronic device obtains order information for a mobile phone, compares whether it matches information on or regarding items that can be traded in, and, if it is determined that the comparison information matches, sale guide information 320 for the sales item may be provided on the order page. The sale guide information 320 for the sales item may still be provided on the order page even if it is determined that the comparison information does not match.

FIG. 3C is an exemplary diagram of contents included in sale information on or regarding a sales item (e.g., sale guide information 310 corresponding to the purchase items in FIG. 3A or sale guide information 320 corresponding to the purchase items in FIG. 3B).

An electronic device (e.g., the electronic device 100 of FIG. 1 or the electronic device 220 of FIG. 2) may provide a page for the contents included in the sale guide information corresponding to the purchase item in a pop-up format or in a separate page from a search page or an order page. The sale guide information corresponding to the purchase item may include at least one of explanation information on trade-in, promotion information on trade-in, information on a trade-in procedure, and information on notice of trade-in. Referring to FIGS. 3A to 3C, when the electronic device obtains a selection input for the sale guide information 310 and 320 corresponding to the purchase item, a page as in the example of FIG. 3C may be provided in a pop-up format or in a separate page from a search page or an order page.

Sale guide information 310 and 320 corresponding to the purchase item recited as an example in FIGS. 3A to 3C are for a mobile phone, but the sales item is not limited to the mobile phone. For example, if it is for items that can be traded in or items that can be handled by trade-in companies, such as a trade-in for air conditioners, trade-in for refrigerators, trade-in for TVs, or trade-in for computers, corresponding sale guide information may be provided.

Figure 4A:
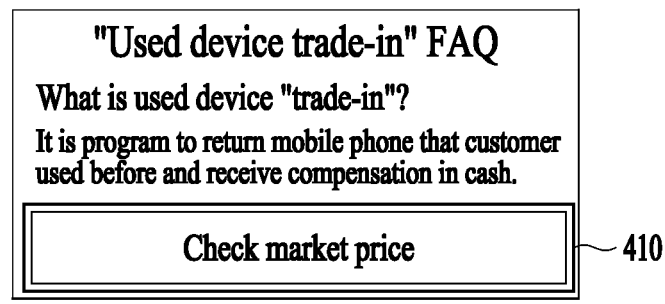
Figure 4B:
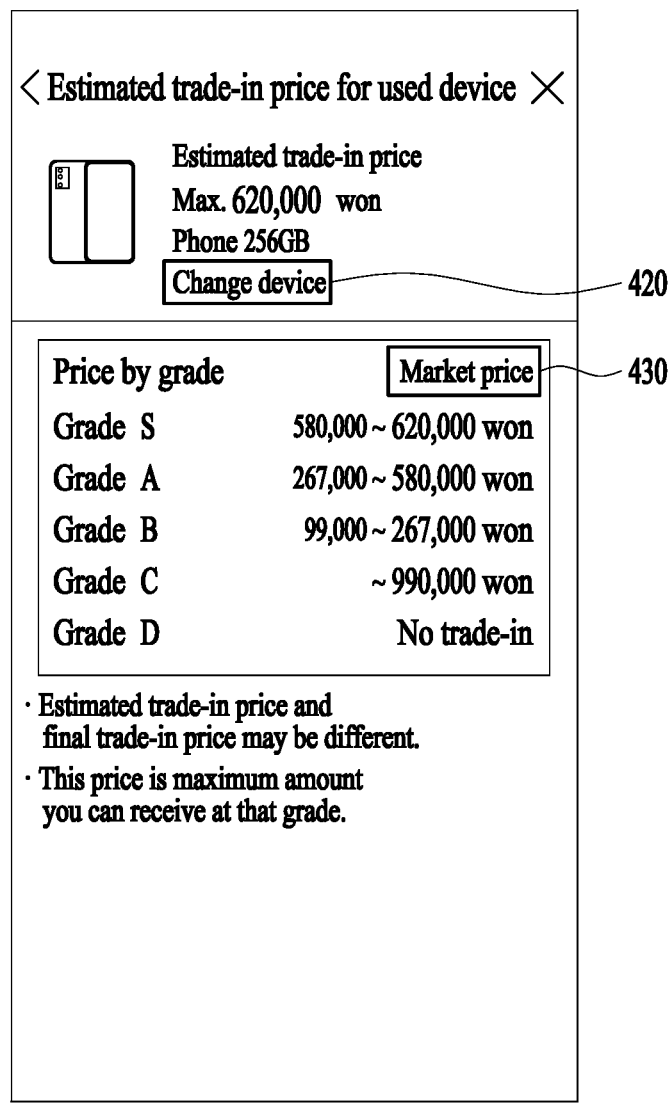

FIGS. 4A to 4C are diagrams illustrating examples of data related to sale price of an information providing method according to various example embodiments.

FIG. 4A is an exemplary diagram illustrating information that may be included in sale guide information 310 and 320 corresponding to the purchase item provided in FIGS. 3A and 3B or information that may be provided as the example of FIG. 3C.

Referring to FIG. 4A, an electronic device (e.g., the electronic device 100 of FIG. 1 or the electronic device 220 of FIG. 2) may provide an area 410 for providing market price inquiry information on a trade-in price on at least a part of a page providing sale guide information corresponding to the purchase item. For example, the electronic device may provide area 410 for providing the market price inquiry information of FIG. 4A on a detail page of FIG. 3C for providing detailed information while providing the sale guide information corresponding to the purchase item.

FIG. 4B is an exemplary diagram of a page corresponding to an input acquisition for an area 410 for providing market price inquiry information of FIG. 4A.

An electronic device (e.g., the electronic device 100 of FIG. 1 or the electronic device 220 of FIG. 2) may provide market price inquiry information when an input into an area for providing market price inquiry information is obtained. For example, the electronic device may provide market price inquiry information corresponding to the purchase item based on the order information. As illustrated in FIG. 4B, the provided market price inquiry information may include at least one of information on or regarding a sales item, data on a sale price, information on notice of trade-in, and sales item change.

Referring to FIG. 4B, the electronic device may provide information on an area 420 for providing information on a change of sales item and information on an area 430 for providing data related to a sale price on at least some of the detail page for the market price inquiry information. For example, when the electronic device obtains a selection input for the information on area 420 for providing the information on the sales item change, the electronic device may provide the customer with the information on the sales item change in a pop-up format or in a separate page. For another example, when the electronic device obtains a selection input for information on the area 430 for providing data related to the sale price, the electronic device may provide the customer with the data related to the sale price in a pop-up format or in a separate page.

When the electronic device obtains a selection input for information on area 420 for providing information on a change of sales item, it may provide information on or regarding items including the item currently being sold. For example, as shown in FIG. 4B, when 'phone 256G' is changed to another item to obtain a selection input for 'phone 512G', the electronic device may provide market price inquiry information in response to the selection input of change.

FIG. 4C is an exemplary diagram of a page corresponding to an input acquisition for information 430 of an area for providing data related to a sale price of FIG. 4B.

An electronic device (e.g., the electronic device 100 of FIG. 1 or the electronic device 220 of FIG. 2) may provide data related to the sale price upon obtaining an input for an area for providing data related to the sale price. For example, the electronic device may provide data related to the sale price of a sales item in the form of a market price table for each grade. Referring to FIG. 4B, it may be classified into S grade, A grade, B grade, C grade, and D grade, and the market price by grade may be set in a certain range and provided. Referring to FIG. 4C, information on factors used to determine a price by grade may be provided. For example, in the case of a mobile phone, the grade may be determined by considering information on condition of the liquid crystal panel, condition of the back (or side) panel, whether there is an afterimage, whether the fingerprint is recognized, condition of the compass (e.g., geomagnetic sensor), condition of the LCD display, condition of voice recording, condition of the camera, condition of Wi-Fi, condition of power supply, and the like as a whole. Those illustrated in FIG. 4C may be elements of the criteria for determining grade for a mobile phone, and, for different items, the elements of the grading criteria may be different. The data on the sale price may include elements of the grading criteria, and the elements of the grading criteria illustrated in FIG. 4C may be represented and referred to as the condition of the items for sale, and the expected sale time of the item for sale may also be included.

Figure 5A:
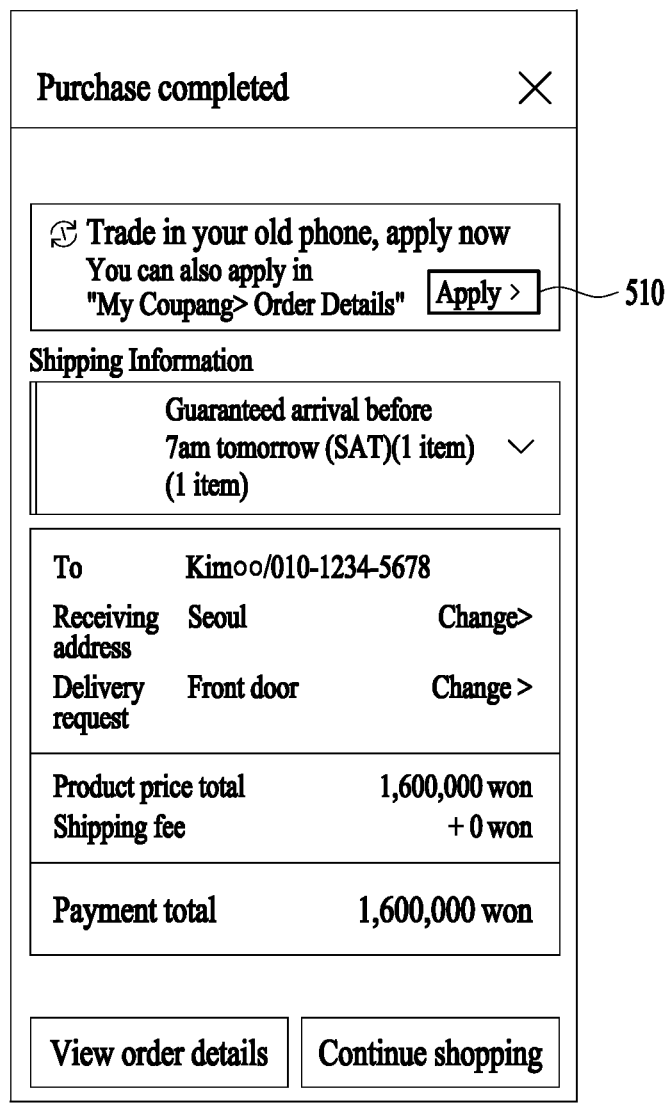
FIGS. 5A and 5B are exemplary diagrams illustrating a sale application of an information providing method according to various example embodiments.
Figure 5B:
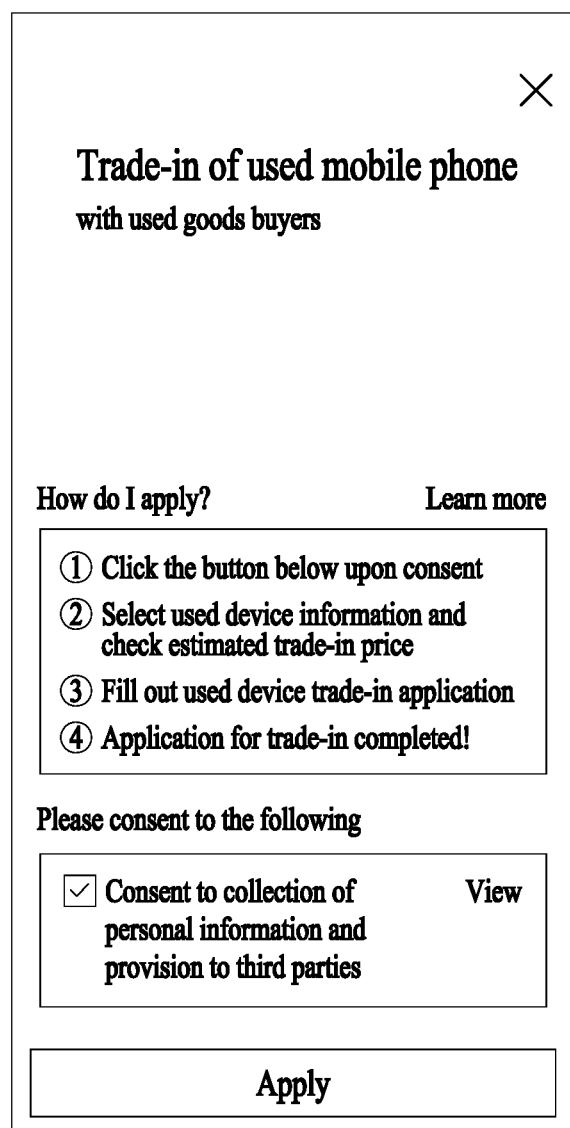

FIGS. 5A and 5B are exemplary diagrams illustrating a sale application of an information providing method, according to various example embodiments.

FIG. 5A is an exemplary diagram of information provided on a first page of an information providing method.

An electronic device (e.g., the electronic device 100 of FIG. 1 or the electronic device 220 of FIG. 2) may provide at least some of order information and sale-related information on the first page. Referring to FIG. 5A, at least one of purchase completion information, item price information, payment amount information, and delivery information that may be included in the order information may be provided on the first page. At least one of customer name information and customer address (or delivery address) information among customer information may be provided on the first page. The first page may provide guide information on applying for a trade-in for a purchase item among the sale-related information.

The electronic device may provide the guide information on applying for a trade-in for a purchase item among the sale-related information on at least part of the first page and a selection input portion 510 for a trade-in application for the purchase item on at least part of the first page.

FIG. 5B is an exemplary diagram of a trade-in application information page provided in response to a selection input obtained on a first page according to an information providing method.

An electronic device (e.g., the electronic device 100 of FIG. 1 or the electronic device 220 of FIG. 2) obtains a selection input of selection input portion 510 for a trade-in application for the purchase item of FIG. 5A and may provide a trade-in application information page. The trade-in application information page may include information about the trade-in procedure and information on terms and conditions. Referring to FIG. 2 and FIG. 5B, when a consent selection input is obtained for the information on terms and conditions of the trade-in application information page and a selection input for an application is obtained, the electronic device performs operations 203 and 205 of FIG. 2 so that the second page may be provided to the customer 210.

FIGS. 6A to 6E are diagrams illustrating examples of inputting information input corresponding to link information of an information providing method, according to various example embodiments.

Figure 6A:
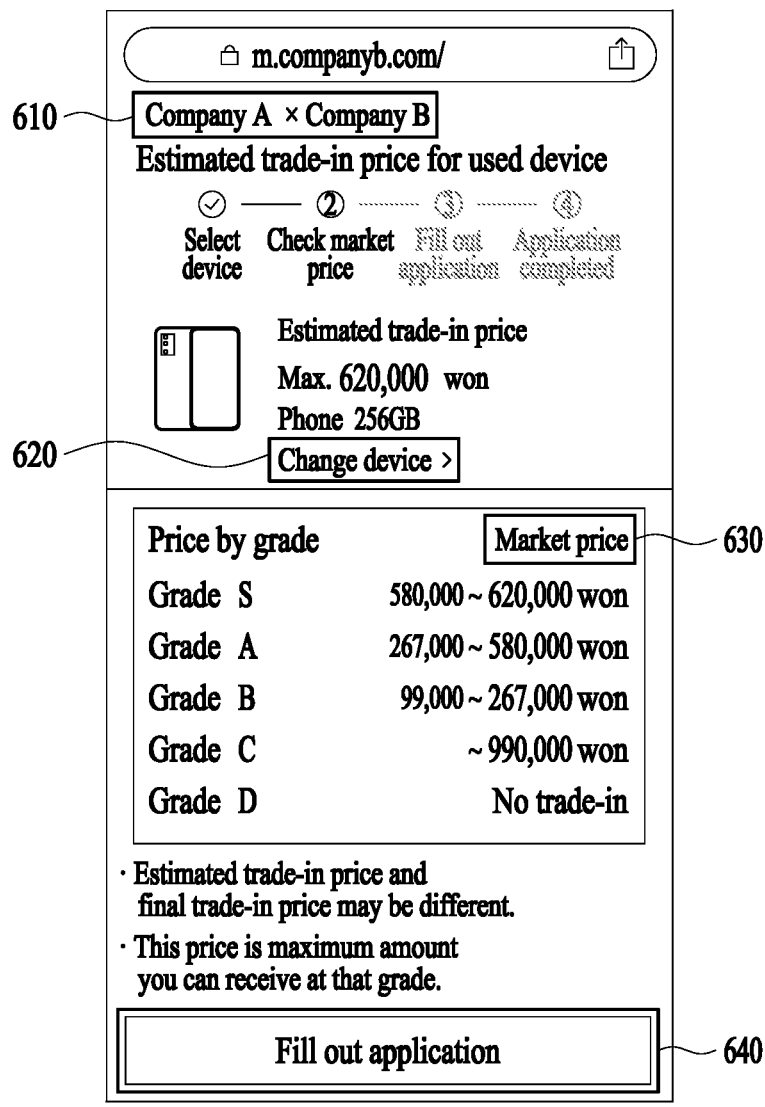

FIG. 6A is an exemplary diagram of a market price check page of a second page corresponding to link information of an information providing method.

Referring to FIG. 2, link information is provided from the electronic device 220 to the customer 210 in operation 205, and a second page may be provided when a link included in the link information is selected. Referring to FIG. 6A, the second page may include a page provided by company B (e.g., the external device 230 of FIG. 2). For example, company B may include at least one of an external company, a trade-in company, and an external device (e.g., the external device 230 of FIG. 2). The information provided on the second page may include information provided on the first page, and may include icon information related to the operating entity of the electronic device. For example, the icon information related to the operating entity of the electronic device may be provided as "company A x company B" 610 of FIG. 6A. The electronic device operating entity may refer to company A, and the external company performing trade-in may refer to company B.

On the market price check page of the second page, the external device may provide at least one of: icon information related to the operating entity of the electronic device, data related to the sale price, estimated trade-in price information, information on area 620 for providing information on the change of sales item, information on area 630 for providing data related to sale price, information on the trade-in process operation, and information on area 640 for moving to the next operation.

The information on area 620 for providing information on the change of the sales item may correspond to the information on area 420 for providing information on the change of the sales item in FIG. 4B, and area 630 for providing data related to the sale price may correspond to information on area 430 for providing data related to the sale price of FIG. 4B.

Figure 6B:
Figure 6C:
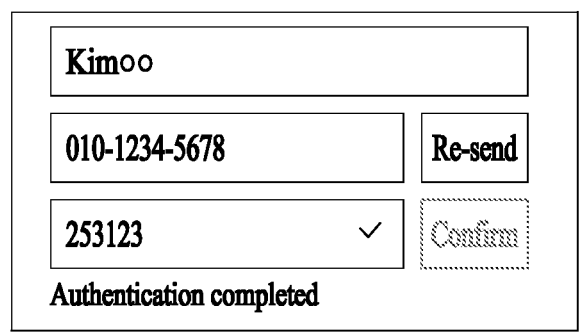
Figure 6D:
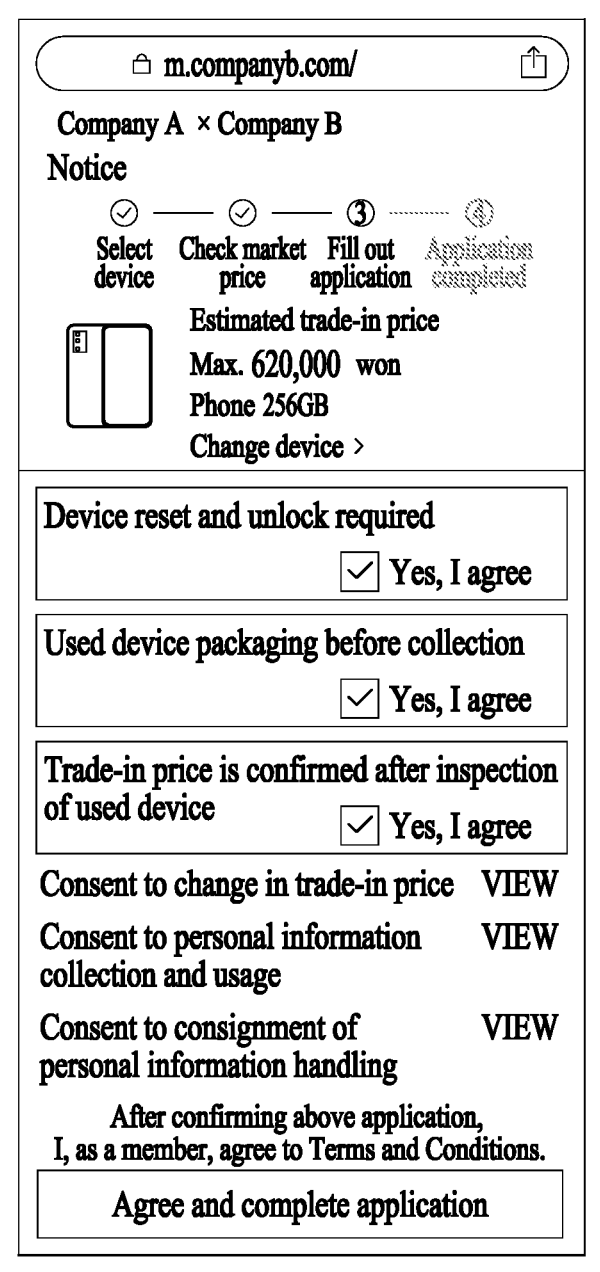

FIGS. 6B to 6D are exemplary diagrams of an application preparation page among the second pages of an information providing method.

An external device (e.g., the external device 230 of FIG. 2) may provide at least some information provided on the price check page of FIG. 6A to be included in the application preparation page of the second page. For example, on the application preparation page of the second page, at least one of: icon information related to the operating entity of the electronic device, data related to the sale price, estimated trade-in price information, information on the trade-in process operation, and information on the area for moving to the next operation may be provided.

The external device may provide at least one of information on an area 650 for inputting identification information of the sale item, information on an area 660 for inputting customer information, information on an area for inputting a visit collection address, information on an area for inputting a collection date and a collection request, and information on an area for inputting an account number to which a trade-in amount is to be deposited on the application preparation page of the second pages.

Information of an area 650 for inputting identification information of an item may include an IMEI number, for example, in the case of a mobile phone. The IMEI of a mobile phone is the International Mobile Equipment Identity, which means the unique serial number of the mobile phone. Since the IMEI number of the mobile phone is unique identification information that does not change even when the owner of the mobile phone changes, information such as whether the mobile phone is lost or used can be provided by searching the IMEI number. Referring to FIG. 6B, when an IMEI number is input in the area 650 for inputting identification information of an item for sale on the application preparation page of the second page, it can be confirmed whether it corresponds to a valid IMEI number. In this case, the validity of the IMEI number can be checked on the IMEI number lookup site through an external link. The IMEI number of FIG. 6B may provide information on whether it is used or when it is shipped, which helps to compare it with data related to the sale price when applying for a trade-in.

Information on the area 660 for inputting customer information may be the same as information transmitted to the external device 230 through the electronic device 220 in operation 202 of FIG. 2. The information on the area 660 for inputting customer information provided on the second page of FIG. 6B may be for comparison with customer information received by the external device 230 in operation 202 of FIG. 2. For example, the electronic device may obtain information for proceeding with an application for a trade-in while purchasing an item. At this time, the customer information transmitted by the electronic device to the external device 230 along with order information in operation 202 of FIG. 2 may be the same as the customer information authenticated in FIG. 6B. For another example, the electronic device may obtain order information for purchasing an item, and obtain information on application for a trade-in during a period from a time when the item is purchased to a time when the item is no longer used. In this case, the customer information transmitted by the electronic device to the external device 230 along with the order information in operation 202 of FIG. 2 may be the same as or different from the customer information authenticated in FIG. 6B. When the customer information in operation 202 of FIG. 2 and the customer information in FIG. 6B are different from each other, it may correspond to a case where the owner of the purchased item is changed. The area 660 for inputting customer information of FIG. 6B is not for determining whether the customer information matches the customer information in operation 202 of FIG. 2, but may be for determining whether or not the user is a valid person such as identity authentication. FIG. 6C is an example of performing identity authentication, and the area 660 for inputting customer information of FIG. 6B may include an area for inputting an authentication number for identity authentication as input customer information.

Referring to FIG. 6D, the application preparation page among the second pages may provide at least one of consent information before proceeding with sale and information on terms and conditions. The external device may activate an input of the application completion area upon obtaining the checked input of the consent information before proceeding with sale and checked input of the information on the terms and conditions on the application preparation page of the second page.

FIG. 6E is an exemplary diagram of an application completion page among the second pages of an information providing method.

When an external device (e.g., the external device 230 of FIG. 2) obtains an input for completing a customer's application, it may switch to the page of FIG. 6D to FIG. 6E to provide with. On the application completion page of the second page, the electronic device may provide at least one of: icon information related to the operating entity of the electronic device, data related to the sale price, information on the trade-in process operation, information on the trade-in application date, information on or regarding the trade-in customer, information on or regarding the trade-in item, and information on a procedure after a trade-in application.

Referring to FIG. 6E, the external device may be redirected to the first page when it obtains an input for the "application detail view" area at the bottom of the application completion page among the second pages. For another example, when the electronic device obtains an input for the "return to company A" area at the bottom of the application completion page among the second pages, the electronic device may be redirected to a sale page operated by the electronic device.

FIGS. 6A to 6E may be examples of pages included in the second page and provided in the order of FIGS. 6A to 6E as a trade-in application is in progress, or it may be provided in the order of FIGS. 6E to 6A when proceeding operation by step backward.

Figure 7:
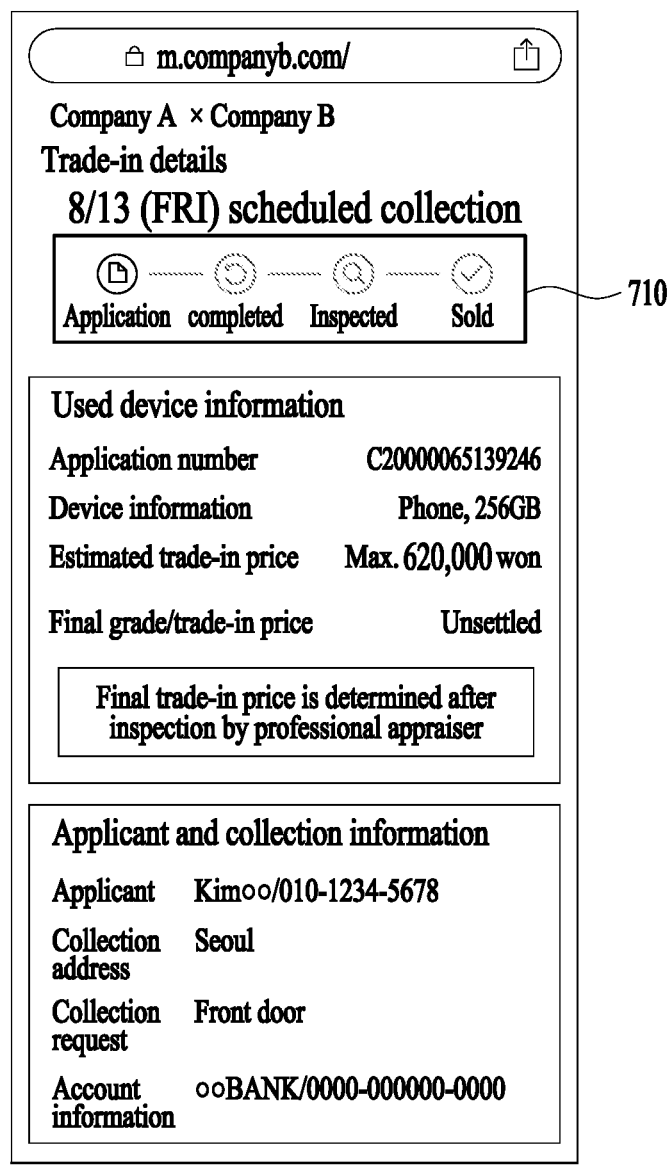
FIG. 7 is a diagram illustrating an example of providing progress information on sale-related information of an information providing method according to various example embodiments.

FIG. 7 is a diagram illustrating an example of providing progress information on sale-related information of an information providing method according to various example embodiments.

FIG. 7 is an exemplary diagram of progress information on sale-related information after an application is completed in the second page of the information providing method.

An external device (e.g., the external device 230 of FIG. 2) may provide a progress information page for sale-related information when information on the completion of the customer's trade-in application on the second pages of FIGS. 6A to 6B is obtained. The progress information page for the sale-related information may provide at least one of: icon information related to an operating entity of the electronic device, information on or regarding a sales item, information on or regarding a trade-in applicant and visit collection, and trade-in progress information 710.

The trade-in progress information 710 of FIG. 7 may sequentially provide information on which trade-in is in progress. For example, an external device (e.g., the external device 230 of FIG. 2) may provide information of "application complete" among the trade-in progress information 710 in response to an input of completing the trade-in application. For another example, when the external device obtains information on the trade-in progress according to the information scheduled for visit collection on Friday, August 13, it may provide information of "collection complete", "inspection complete", and "sale complete" sequentially. After the collection of the item is completed on Friday, August 13, the external device can inspect the collected item according to the sale price data and set the sale price. The external device may provide information on the set sale price to at least one of a seller (e.g., a customer) of the item and an electronic device, and may provide information of sale complete when the item is sold to a third party. The external device may transmit information of "collection complete", "inspection complete", and "sale complete" to the electronic device after completing individual procedures, which may be included in operation 207 of FIG. 2. The electronic device may provide the customer with the information of "collection complete", "inspection complete", and "sale complete" received from the external device, which may be included in operation 208 of FIG. 2.

In FIG. 7, the trade-in progress information 710 is an example provided on the second page, but may also be provided on the first page after the trade-in application is completed. In addition, icon information 610 related to the operating entity in FIG. 6A is an example provided on the second page, but the icon information related to the operating entity, company A, may also be provided on the first page.

A method of providing order-related information by an electronic device according to various example embodiments may include obtaining order information on or regarding a purchase item and customer information corresponding to the order information, transmitting the order information and the customer information to an external device, receiving, from the external device, sale-related information on or regarding a sales item that corresponds to the purchase item and is for sale by the customer, and providing at least some of the order information and the sale-related information on a first page.

The method of providing order-related information by an electronic device according to various example embodiments may further include providing link information for accessing the external device, and the sale-related information may be input on a second page corresponding to the link information.

The operation of transmitting to an external device of the method of providing order-related information by an electronic device according to various example embodiments may include transmitting authentication information corresponding to the link information to the external device, and the second page corresponding to the link information may be accessible based on the authentication information.

In the method of providing order-related information by an electronic device according to various example embodiments, an icon related to an operating entity of the electronic device may be displayed on the first page and the second page.

The method of providing order-related information by an electronic device according to various example embodiments may further include receiving progress information on the sale-related information from the external device; and providing the progress information on the first page.

The authentication information of the method of providing order-related information by an electronic device according to various example embodiments may include information having validity for a preset period of time.

The method of providing order-related information by an electronic device according to various example embodiments may further include providing data related to a sale price on the first page and the second page upon receiving the data related to the sale price according to a condition of the sales item and an expected sale time of the sales item.

The operation of receiving sale-related information of the method of providing order-related information by an electronic device according to various example embodiments may include identifying identification information of a portable terminal if the sales item is the portable terminal.

The order information of the method of providing order-related information by an electronic device according to various example embodiments may include sale guide information corresponding to the purchase item.

The data related to the sale price of the method of providing order-related information by an electronic device according to various example embodiments may be received periodically from the external device.

An electronic device according to various example embodiments includes a transceiver, a database, and a processor. The processor may be configured to obtain order information on or regarding a purchase item and customer information corresponding to the order information, transmit the order information and the customer information to an external device, receive, from the external device, sale-related information on or regarding a sales item that corresponds to the purchase item and is selling by the customer, and provide at least some of the order information and the sale-related information on a first page.

The processor of the electronic device according to various example embodiments may be further configured to provide link information for accessing the external device, and the sale-related information may be entered on a second page corresponding to the link information.

The processor of the electronic device according to various example embodiments may be further configured to transmit authentication information corresponding to the link information to the external device, and the second page corresponding to the link information may be accessible based on the authentication information.

In the electronic device according to various example embodiments, an icon related to an operating entity of the electronic device may be displayed on the first page and the second page.

The processor of the electronic device according to various example embodiments may be further configured to receive progress information on the sale-related information from the external device and provide the progress information on the first page.

The authentication information of the electronic device according to various example embodiments may include information having validity for a preset period of time.

The processor of the electronic device according to various example embodiments may be further configured to provide data related to a sale price on the first page and the second page upon receiving the data related to the sale price according to a condition of the sales item and an expected sale time of the sales item.

The processor of the electronic device according to various example embodiments may be further configured to identify identification information of a portable terminal if the sales item is the portable terminal.

The order information of the electronic device according to various example embodiments may include sale guide information corresponding to the purchase item.

The data related to the sale price of the electronic device according to various example embodiments may be received periodically from the external device.

Meanwhile, some example embodiments of the present disclosure have been described in this specification and drawings. Though specific terms have been used, these terms are used in a general sense only for an easy description of the technical content of the present disclosure and a better understanding of the present disclosure, and are not intended to limit the scope of the present disclosure. It will be clear to those skilled in the art that, in addition to the example embodiments disclosed here, other modifications based on the technical idea of the present disclosure may be implemented.

The electronic device or terminal according to the above-described example embodiments may include a processor, a memory for storing and executing program data, a permanent storage such as a disk drive, a communication port for communicating with an external device, a user interface device such as a touch panel, a key, a button, or the like. Methods implemented as software modules or algorithms may be stored on a computer-readable recording medium as computer-readable codes or program instructions executable on the processor. Here, the computer-readable recording medium includes a magnetic storage medium (e.g., ROM (read-only memory), RAM (random-Access memory), floppy disk, hard disk, etc.) and optical reading medium (e.g., CD-ROM and DVD (Digital Versatile Disc)). The computer-readable recording medium is distributed over networked computer systems, so that computer-readable codes can be stored and executed in a distributed manner. The medium is readable by a computer, stored in a memory, and executed on a processor.

The present embodiments can be represented by functional block configurations and various processing steps. These functional blocks may be implemented with various numbers of hardware or/and software configurations that perform specific functions. For example, the example embodiment may employ an integrated circuit configuration such as memory, processing, logic, look-up table, or the like, capable of executing various functions by control of one or more microprocessors or other control devices. Similar to that components can be implemented with software programming or software elements, this example embodiment includes various algorithms implemented with a combination of data structures, processes, routines or other programming components and may be implemented with a programming or scripting language including C, C++, Java, assembler, etc. Functional aspects can be implemented with an algorithm running on one or more processors. In addition, the present embodiments may employ a conventional technique for at least one of electronic environment setting, signal processing, and data processing. Terms such as "mechanism", "element", "means", and "composition" can be used in a broad sense, and are not limited to mechanical and physical configurations. Those terms may include the meaning of a series of routines of software in connection with a processor or the like.

The above-described example embodiments are merely examples, and other example embodiments may be implemented within the scope of the claims to be described later.

What is claimed is:

1. A method of facilitating a purchase of an ordered item between a terminal and an external device by an intermediate electronic device, wherein the purchase includes a trade-in of a trade-in item corresponding to the ordered item, the method comprising:
    obtaining, by a transceiver of the intermediate electronic device, first data indicative of an order by a customer associated with the terminal to purchase an ordered item, the first data including customer information corresponding to the order, the first data including a trade-in request of the trade-in item;
    transmitting, by the transceiver of the intermediate electronic device, the first data to the external device configured to manage transactions related to the trade-in request for authentication of the customer by the external device;
    generating authentication data related to the order, the authentication data comprising a token;
    transmitting, by the transceiver to the external device, the token for authentication of the token by the external device based on a determination, by the external device, that the order corresponds to a request to purchase the ordered item;
    in response to the authentication of the token by the external device, receiving, by the transceiver from the external device, a response to the token;
    determining the response is associated with the external device;
    determining that the external device is configured to manage transactions related to the trade-in request;
    authenticating the external device based on determining that the external device is configured to manage transactions related to the trade-in request;
    in response to the authenticating of the external device, receiving, by the transceiver from the external device, second data including sale-related information for the trade-in item and a request to provide link information to the customer, the sale-related information including trade-in information related to the trade-in request;
    authenticating the request to provide link information to the customer;
    in response to authenticating the request to provide link information to the customer;
    generating, based at least on the authentication data and the sale-related information, third data including link information unique to the trade-in request; and
    transmitting, by the transceiver to the terminal in data communication with the intermediate electronic device, the third data relating to the link information and fourth data including at least a portion of the sale-related information for the trade-in item, wherein the third data and the fourth data cause the terminal to display a web page for trade-in and at least the portion of the sale-related information for the trade-in item on a user interface (UI) of the terminal, wherein the web page is provided by the external device,
    wherein data related to a sale price of the ordered item is received periodically from the external device.

2. The method of claim 1, wherein the web page is accessible by the customer based on the authenticating of the request to provide link information to the customer.

3. The method of claim 1, wherein the web page comprises a first page and a second page, wherein an icon related to an operating entity of the intermediate electronic device is displayed on the first page and the second page.

4. The method of claim 1, further comprising:
    receiving progress information on the sale-related information from the external device; and
    providing the progress information on a first page of the web page.

5. The method of claim 1, wherein the authentication data includes information having validity for a preset period of time.

6. The method of claim 1, further comprising:
    providing the data related to the sale price based on receiving the data related to the sale price according to a condition of the trade-in item and an expected sale time of the trade-in item.

7. The method of claim 1, wherein the trade-in item is a portable terminal, wherein the receiving of the second data comprises identifying identification information of the portable terminal.

8. The method of claim 1, wherein the first data includes sale guide information corresponding to the ordered item.

9. An intermediate electronic device for facilitating a purchase of an ordered item between a terminal and an external device, wherein the purchase includes a trade-in of a trade-in item corresponding to the ordered item, the intermediate electronic device comprising:
    a transceiver;
    a database; and
    a processor, wherein the processor is configured to:
        obtain, by a transceiver of the intermediate electronic device, first data indicative of an order by a customer associated with the terminal to purchase an ordered item, the first data including customer information corresponding to the order, the first data including a trade-in request of the trade-in item;
        transmit, by the transceiver of the intermediate electronic device, the first data to the external device configured to manage transactions related to the trade-in request for authentication of the customer by the external device;
        generate authentication data related to the order, the authentication data comprising a token;
        transmit, by the transceiver to the external device, the token for authentication of the token by the external device based on a determination, by the external device, that the order corresponds to a request to purchase the ordered item;

in response to the authentication of the token by the external device, receive, by the transceiver from the external device, a response to the token;

determine the response is associated with the external device;

determine that the external device is configured to manage transactions related to the trade-in request;

authenticate the external device based on determining that the external device is configured to manage transactions related to the trade-in request;

in response to authenticating of the external device, receive, by the transceiver from the external device, second data including sale-related information for the trade-in item and a request to provide link information to the customer, the sale-related information including trade-in information related to the trade-in request;

authenticate the request to provide link information to the customer;

in response to authenticating the request to provide link information to the customer:

generate, based at least on the authentication data and the sale-related information, third data including link information unique to the trade-in request; and transmit, by the transceiver to the terminal in data communication with the intermediate electronic device, the third data relating to the link information and fourth data including at least a portion of the sale-related information for the trade-in item, wherein the third data and the fourth data cause the terminal to display a web page for trade-in and at least the portion of the sale-related information for the trade-in item on a user interface (UI) of the terminal, wherein the web page is provided by the external device, wherein data related to a sale price of the ordered item is received periodically from the external device.

10. The electronic device of claim 9, wherein the web page is accessible by the customer based on authenticating the request to provide link information to the customer.

11. The electronic device of claim 9, wherein the web page comprises a first page and a second page, wherein an icon related to an operating entity of the intermediate electronic device is displayed on the first page and the second page.

12. The electronic device of claim 9, wherein the processor is further configured to:

receive progress information on the sale-related information from the external device; and provide the progress information on a first page of the web page.

13. The electronic device of claim 9, wherein the authentication data includes information having validity for a preset period of time.

14. The electronic device of claim 9, wherein the processor is further configured to provide the data related to the sale price based on receiving the data related to the sale price according to a condition of the trade-in item and an expected sale time of the trade-in item.

15. The electronic device of claim 9, wherein the trade-in item is a portable terminal, wherein the processor is further configured to identify identification information of the portable terminal.

16. The electronic device of claim 9, wherein the first data includes sale guide information corresponding to the ordered item.

* * * * *